US010526139B2

(12) United States Patent
Wang et al.

(10) Patent No.: US 10,526,139 B2
(45) Date of Patent: Jan. 7, 2020

(54) TOUCHING INDUCTION GARBAGE CONTAINER WITH STANDBY-OPENING FUNCTION AND CONTROLLING METHOD THEREOF

(71) Applicant: FUJIAN NASHIDA ELECTRONIC INCORPORATED COMPANY, Fujian (CN)

(72) Inventors: Xin Wang, Fuzhou (CN); Jiangqun Chen, Fuzhou (CN)

(73) Assignee: Nnine Starts Group (U.S.A.) Inc., Pomona, CA (US)

( * ) Notice: Subject to any disclaimer, the term of this patent is extended or adjusted under 35 U.S.C. 154(b) by 0 days.

(21) Appl. No.: 16/083,883

(22) PCT Filed: Feb. 20, 2017

(86) PCT No.: PCT/CN2017/074091
§ 371 (c)(1),
(2) Date: Sep. 10, 2018

(87) PCT Pub. No.: WO2017/152746
PCT Pub. Date: Sep. 14, 2017

(65) Prior Publication Data

US 2019/0077595 A1 Mar. 14, 2019

(30) Foreign Application Priority Data

Mar. 10, 2016 (CN) .......................... 2016 1 0135044

(51) Int. Cl.
*G05B 5/00* (2006.01)
*B65F 1/16* (2006.01)

(52) U.S. Cl.
CPC .............. *B65F 1/1638* (2013.01); *B65F 1/16* (2013.01); *B65F 2210/139* (2013.01); *B65F 2210/168* (2013.01)

(58) Field of Classification Search
CPC .... B65F 1/16; B65F 1/1638; B65F 2210/139; B65F 2210/168
See application file for complete search history.

(56) References Cited

U.S. PATENT DOCUMENTS

| | | | | |
|---|---|---|---|---|
| 6,211,637 B1 * | 4/2001 | Studer | B65F 1/141 | 318/16 |
| 2009/0057317 A1 * | 3/2009 | Wang | B65F 1/1426 | 220/495.06 |
| 2010/0059515 A1 * | 3/2010 | Wilkerson | A47G 19/2227 | 220/260 |

* cited by examiner

*Primary Examiner* — Muhammad S Islam
(74) *Attorney, Agent, or Firm* — Raymond Y. Chan; David and Raymond Patent Firm

(57) ABSTRACT

A controlling method for touching induction garbage container with standby-opening function is provided. It provides a standby-opening working mode managed by a timing unit provided in a microcontroller. The timing unit times the triggering time of the microswitch foot pedal. As a user has touched the microswitch foot pedal for more than an induction time, setting as "t" seconds, the microcontroller will be switched to the standby-opening working mode. The microcontroller will be switched back to a regular working mode if the microswitch foot pedal is being touched again. The present invention provides a technical solution of a practical combination of a regular working mode and a standby-opening working mode, which is fully ergonomic and easy to utilize while ensuring service life spans of the driving mechanism and apparatus, increasing service life span of the battery and enhancing the power-saving performance of the touching induction garbage container.

4 Claims, 4 Drawing Sheets

TOUCHING INDUCTION GARBAGE CONTAINER WITH STANDBY-OPENING FUNCTION AND CONTROLLING METHOD THEREOF

CROSS REFERENCE OF RELATED APPLICATION

This is a non-provisional application that claims the benefit of priority under 35U.S.C.§ 371 to a PCT application, application number PCT/CN2017/074091, filed Feb. 20, 2017, which claims priority of a Chinese application, application number 201610135044.4, filed Mar. 10, 2016.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a controllable household garbage container, and more particularly to a touching induction garbage container with standby-opening function and controlling method thereof.

Description of Related Arts

According to the conventional technology of touching induction garbage container, once a microswitch foot pedal installed on a lower part of the container body is slightly touched by the user's foot, the container lid can be driven by the motor and automatically opened for about 3 seconds (the time for throwing garbage into the container). Thereafter, the container lid is closed again automatically. For examples, China Pat. No. 201020244656.5, entitled "Light Touch Type Electric Garbage Can" and China Pat. No. 201120167964.7, entitled "Soft Touch Type Buffering Cover Closing Electrical Garbage Can". However, both prior arts fail to provide any suggestion to maintain the container lid in opened condition, which means it fails to provide a standby-opening function. Nonetheless, in daily occasions, it is an often condition for keep dumping garbage or trash frequently, such as during cooking, eating nuts, peeling fruits, and etc. In such cases, the container lid is preferred to be opened the container lid for a longer time. To those touching induction garbage containers without standby-opening function, i.e. the container lid is opened and activated to remain opened until it is activated to close, when frequently dumping trash or garbage is needed, it is required to repeatedly and frequently touch the microswitch foot pedal with the user's foot. It is not user-friendly at all and, since most touching induction garbage containers are powered by batteries, the frequent container lid opening and closing operation consume plenty of power and reduce the service life span of the mechanism thereof.

SUMMARY OF THE PRESENT INVENTION

An object of the present invention is to provide a controlling method of a touching induction garbage container with standby-opening function, which does overcome the drawbacks of the conventional touching induction garbage container as mentioned above and is easy to utilize, reliable, effective in power-saving accordingly.

This and other objects of the present invention are achieved through the following implementation:

A controlling method of a touching induction garbage container with standby-opening function includes the following steps:

providing an induction garbage container, which comprises a container body, a container lid, a driving mechanism, a motor, a motor driving and controlling circuit, a microswitch foot pedal, and a microcontroller, wherein the container lid is connected with the driving mechanism and the driving mechanism is electrically connected to the motor driving and controlling circuit through the motor, wherein the circuit of the microswitch foot pedal and the motor driving and controlling circuit are both connected to an input port and an output port of the microcontroller respectively;

receiving a triggering signal when the microswitch foot pedal is triggered, wherein the microcontroller has a timing unit which is preset to be "t" seconds as an induction time for standby opening, wherein when the microswitch foot pedal is triggered, the microcontroller receives the triggering signal;

starting a container lid opening process which includes controlling the motor driving and controlling circuit to drive the motor to rotate forward through the microcontroller to further drive the driving mechanism to act and open the container lid, wherein when the container lid is opened, the motor stops rotating;

activating the timing unit to count time when the container lid opening process starts until the user's foot leave the microswitch foot pedal that the triggering signal sending to the microcontroller is stopped and the time counting is completed, and a counted timing is obtained;

comparing the counted timing with the preset "t" seconds of the induction time for standby opening;

entering a regular working mode if the counted time is shorter than the preset "t" seconds of the induction time, wherein when the microcontroller enters the regular working mode, the container lid is kept being opened for "s" seconds after the container lid opening process, and then a container lid closing process is implemented, wherein the container lid closing process includes controlling the motor driving and controlling circuit to drive the motor to rotate backward through the microcontroller, such that the motor drives the driving mechanism to act and close the container lid, wherein when the container lid is closed, the motor stops rotating and the induction garbage container enters a standby mode; and entering a standby-opening working mode if the counted time is longer than the preset "t" seconds of the induction time, wherein when the microcontroller enters the standby-opening working mode, the motor is remained motionless after the container lid opening process is finished and the container lid is kept in the opened state, wherein when the user's foot leaves the microswitch foot pedal, the microcontroller still remains in the opened state, wherein when the microswitch foot pedal is touched and triggered again, the microcontroller receives the triggering signal again and enters the container lid closing process, wherein when the container lid is closed, the microcontroller enters the standby mode.

In daily application, the users are used to slightly touch the microswitch foot pedal once and retract his foot immediately. The touching time is relatively short. In most cases, it requires only a very short moment for throwing trash into the garbage container, especially to an induction garbage container. As a result, persons skilled in the art tend to think of technical solutions under such regular working mode only, which is unfortunately away from real daily use. The present invention, on the other hand, well considers the needs of the actual practices and provides a technical solution of a practical combination of the regular working mode and an innovative standby-opening working mode, which advantages include the following:

First, it is a fully ergonomic design to achieve a working mode of long time opening of the container lid and to satisfy needs of the utilization of induction garbage container in everyday life.

Second, it allows the user to switch the garbage container to the standby-opening mode through touching it for a predetermined triggering time and switch it back to the regular mode through a single touch, which avoids the inconvenience of repeated multiple touchings of the micro-switch foot pedal.

Lastly, it avoids energy wasting and short service life of the mechanism caused by frequent triggering of the micro-switch foot pedal. The driving mechanism only has to move once in the beginning of the standby-opening mode rather than opening and closing frequently and repeatedly, such that the service life span of the mechanism can be ensured. It can also save a lot of energy of the battery for triggering, driving, container lid opening, and container lid closing, so as to increase the service life span of the battery and achieve an excellent power-saving performance.

In particular, the present invention may further provide the following:

In one embodiment, the microcontroller comprises a wakeup port, connected with the circuit of the microswitch foot pedal. The working modes of the microcontroller also include a sleep mode. After the user's foot left from the microswitch foot pedal in the standby-opening working mode, the microcontroller will enter the sleep mode. When the wakeup port receives a triggering signal from the circuit of the microswitch foot pedal, the microcontroller will quit the sleep mode, execute the container lid closing process, and enter the standby-opening working mode.

In one embodiment, because the container lid remains opened for a longer time in the standby-opening working mode, the present invention also provides a sleep mode in the microcontroller in order to further save the energy. Thereafter, the microcontroller can be awakened through a wakeup port. In the sleep mode, the microcontroller only keeps the wakeup port as a terminal, which greatly saves electricity consumption and further enhances the power-saving performance.

In one embodiment, the triggering time, "t" seconds, for long time opening of the container lid is 2-4 seconds.

In one embodiment, once the microswitch foot pedal is slightly touched, the microswitch foot pedal will be shifted inward, such that the microswitch will be on and send a triggering signal in a very short time. Nevertheless, it will come up to be nearly 1 second in considering the user's operational customs. In order for the microcontroller to distinguish the commands for regular working mode and standby-opening working mode effectively, the inventor has conducted experiments over and over and discovered the most suitable duration "t" of touching the microswitch foot pedal for triggering the standby-opening working mode is 2 to 4 seconds. A shorter time may lead a misoperation due to the difficulty of telling the intentions of a regular opening and standby-opening working mode. A longer time may give the user a dull feeling during utilizing.

The present invention may further provide the following:

In one embodiment, the microswitch foot pedal further comprises a LED indicator arranged on top thereof. The LED indicator has a control connected with the output port of the microcontroller, such that when the microswitch foot pedal is triggered and the microcontroller receives the triggering signal, the microcontroller will output a signal to light up the LED indicator. If the triggering time is longer than "t" seconds, the microcontroller will enter the standby-opening working mode and output a signal to turn off the LED indicator.

The users can therefore know how long it requires to keep touching the microswitch foot pedal and activate the garbage container entering the long-time opening state, which makes the utilization more intuitive and easy for the users. Therefore, a LED indicator is connected to an output port of the microcontroller, such that when the microswitch foot pedal is triggered, the LED indicator will be lighted up. While the triggering time is longer than "t" seconds, the LED indicator will be turned off, so as to give the user a prompt for retracting his or her foot from the microswitch foot pedal. Besides, when the microcontroller is in the standby-opening working mode, the LED indicator is off. In addition, the LED indicator is installed above the microswitch foot pedal, which is the most reasonable for observation and convenience of installation.

In view of above, the present invention provides a controlling method of touching induction garbage container with standby opening function, which provides a technical solution of a practical combination of regular working mode and standby-opening working mode, which is fully ergonomic and easy to utilize. The service life spans of the driving mechanism and apparatus are guaranteed. The service life span of the battery(ies) is also increased based on the excellent power-saving performance provided.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
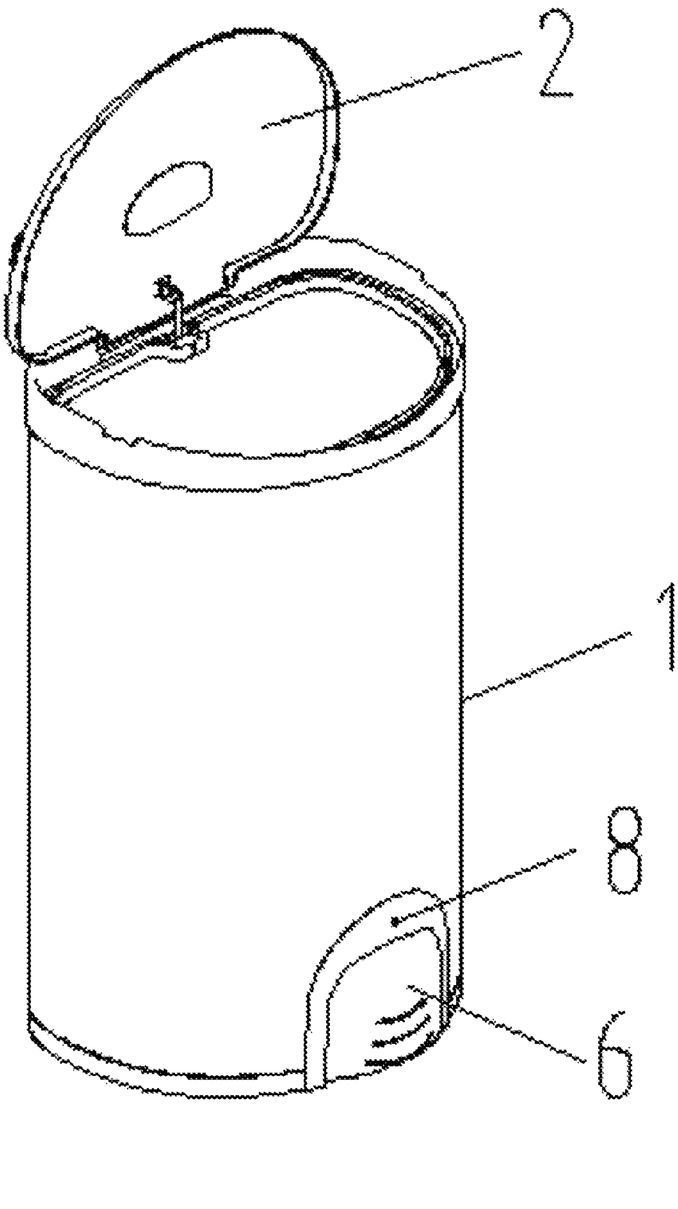
FIG. 1 is a perspective view of a touching induction garbage container according to a preferred embodiment of the present invention.
Figure 2:
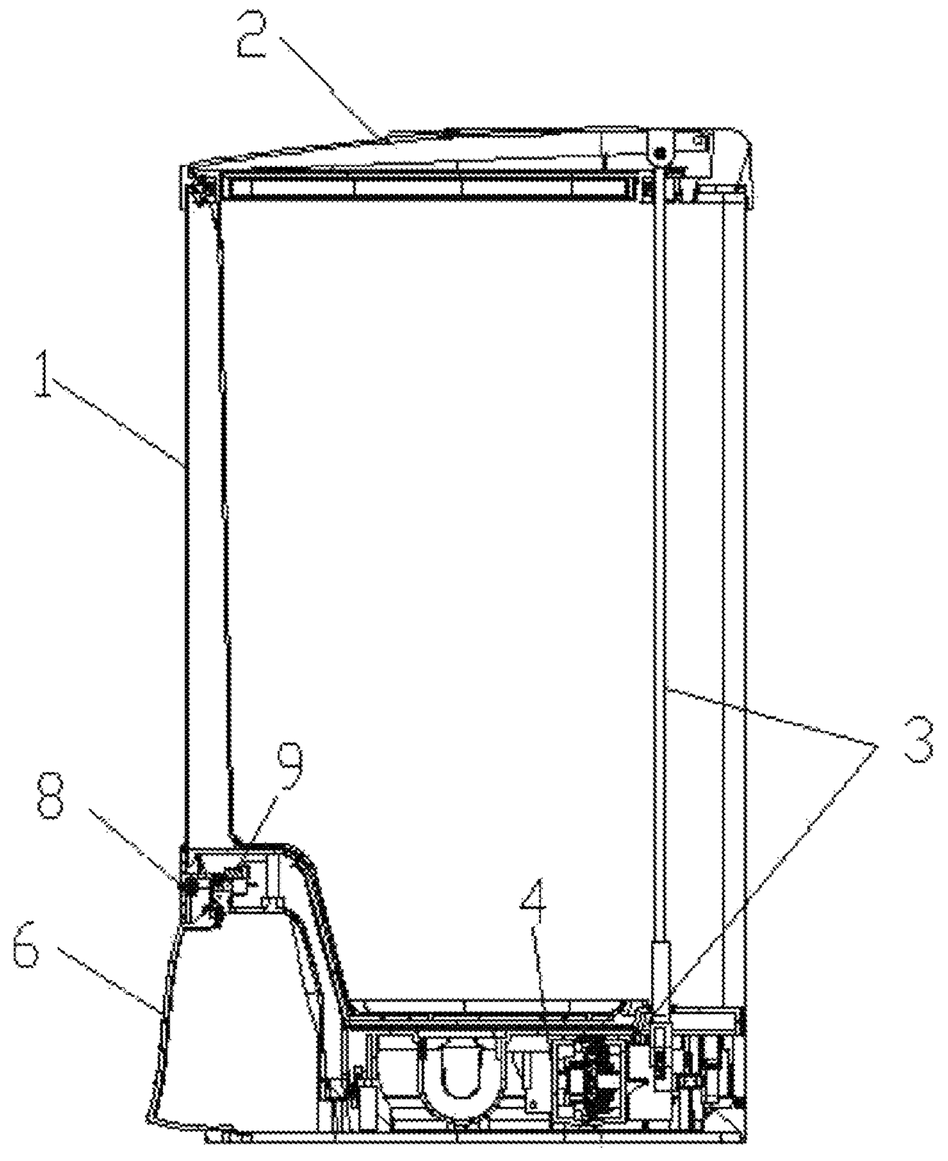
FIG. 2 is a sectional view of the touching induction garbage container according to the above preferred embodiment of the present invention.
Figure 3:
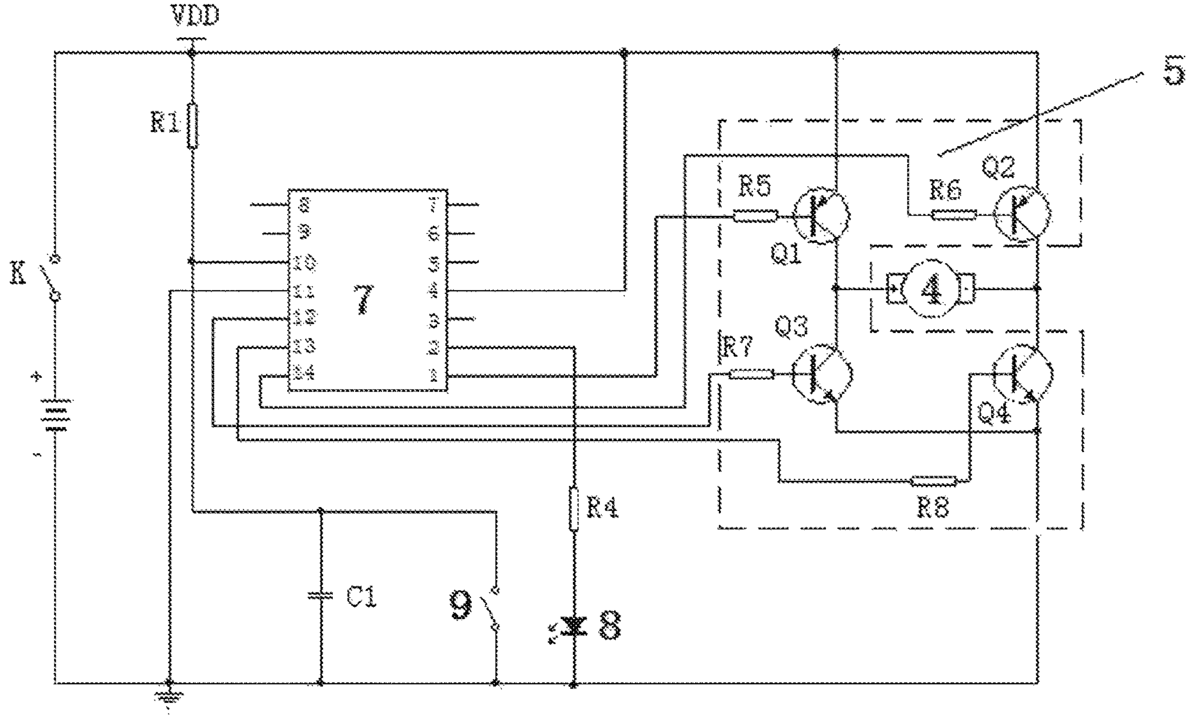
FIG. 3 is a circuit diagram of the touching induction garbage container according to the above preferred embodiment of the present invention.

Referring to FIGS. 1-3, a touching induction garbage container with standby-opening function and its controlling method according to a preferred embodiment is illustrated, wherein the touching induction garbage container includes a can body 1, a lid 2, a driving mechanism 3, a motor 4, a motor driving and controlling circuit 5, a microswitch foot pedal 6, and a microcontroller 7. An application program is installed in the microcontroller 7, which includes a timing unit for timing the duration of the microswitch foot pedal 6 being touched. If the duration of the microswitch foot pedal 6 being touched is shorter than "t" seconds (e.g. t=3 seconds), the microcontroller 7 will execute a regular working process. For example, if a person would like to dump trash or garbage, he or she often stretches his or her foot to touch the microswitch foot pedal 6 and then retract it right away. That is, his or her foot will merely stay in touch on the microswitch foot pedal 6 for a shorter time, generally less than 1 second. Once the electric circuit receives the conduction signal of the microswitch 9, the microcontroller 7 will control the motor driving and controlling circuit 5 to drive the motor 4 to rotate forward, such that the motor 4 will drive the driving mechanism 3 to act and open the container lid 2. Once the container lid 2 is opened, the motor 4 will stop rotating and allow the container lid 2 to stay in the opened state for about 3 seconds (for throwing garbage into the container). Then, the microcontroller 7 will control the motor driving and controlling circuit 5 to drive the motor 4 to rotate backward, such that the motor 4 will drive the driving mechanism 3 to act and close the container lid 2. Once the container lid 2 is closed, the motor 4 will stop rotating and the touching induction garbage container will enter a standby mode for the next dumping. The operation time of the opening of the container lid 2 has to be shorter, which is usually shorter than 0.8 second. When the triggering time of the microswitch foot pedal 6 is longer than "t" seconds (e.g. t=3 seconds), the container lid 2 has been opened already and the application program and the microcontroller 7 will be switched into a standby-opening process. In executing the standby-opening process, the motor 4 will hold still and the container lid 2 will stay in the opened state. After the user retracts his or her foot, the container lid 2 will still stay in the opened state, which is a long-opening state, adapted for dumping traches or garbage repeatedly and frequently. When the user would like to close the container lid 2, he or she only has to touch the microswitch foot pedal 6 once again and t the application program will execute a container lid closing process. After the container lid 2 is closed, the application program and the microcontroller 7 will enter the regular standby mode.

Figure 4:
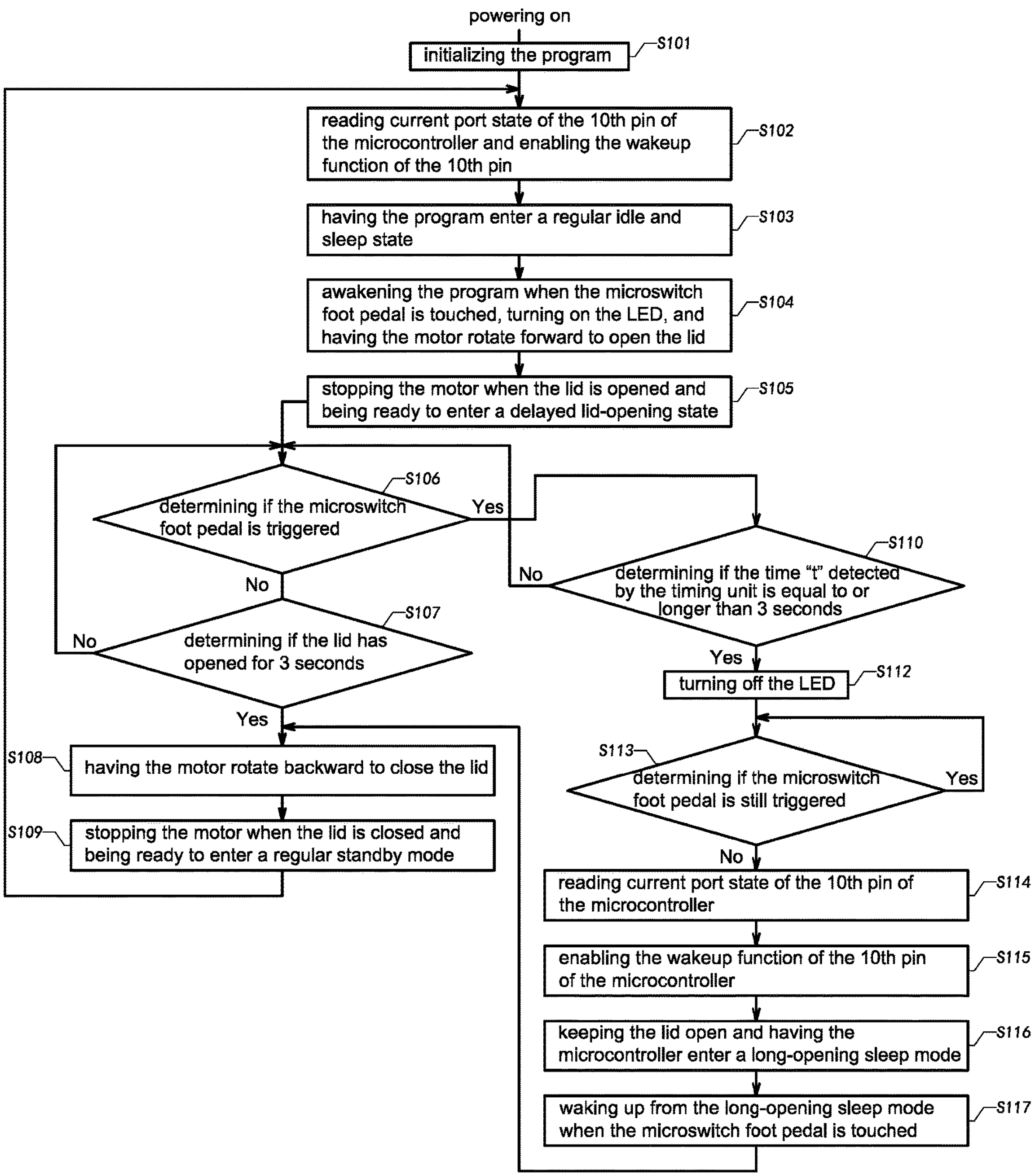
FIG. 4 is a flow chart of illustrating a controlling method of the touching induction garbage container with standby-opening function according to the above preferred embodiment of the present invention.

Referring to FIGS. 3-4, the circuit diagram and flow chart are provided to further illustrate the controlling method of the touching induction garbage container with standby-opening function, wherein the microcontroller 7 implements the opening and closing working modes of the container lid through the driving mechanism 3, the motor 4, motor driving and controlling circuit 5, and the microswitch foot pedal 6. The controlling method comprises the following steps:

S101: initializing the application program, setting the 1st pin, the 2nd pin, the 12th pin, the 13th pin, and the 14th pin of the microcontroller 7 as the output port, and setting the 10th pin of the microcontroller 7 as the input port. The 1st pin and the 14th pin are set as high level, while the 2nd pin, the 12th pin, and the 13th pin are set as low level, wherein, at this moment, the LED indicator 8 is turned off, the triodes Q1-Q4 of the motor driving and controlling circuit 5 are in a cut-off state, the motor 4 is in outage, and the 10th pin is at high level because the microswitch has not been connected and the 10th pin is connected to the positive electrode of the power source through the R1 resistance.

S102: reading the port state of the 10th pin of the microcontroller 7 through the application program, wherein if it is at high level, the 10th pin is able to actuate the wakeup function.

S103: executing a sleep command through the application program, stopping the oscillation of the main oscillator in the microcontroller 7, such that as long as the 10th pin of the microcontroller 7 stays at high level, the application program will not run further, and the application program will enter a regular idle and sleep state.

S104: keeping the container lid 2 closed in the regular idle and sleep state, wherein a user may utilize his or her body to touch the microswitch foot pedal 6 if he or she needs to dump trash or garbage, such that the microswitch 9 will be connected and the 10th pin of the microcontroller 7 will switch from its original high level to low level, wherein the application program will be awaken from the regular idle and sleep state. Then, the main oscillator of the microcontroller 7 will start to oscillate and the application program will be resumed. The 2nd pin of the microcontroller 7 will be set to high level, the LED indicator 8 will be turned on, the 1st pin and the 12th pin of the microcontroller 7 is set to low level, the 13th pin and the 14th pin of the microcontroller 7 is set to high level, the triodes Q1 and Q4 of the motor driving and controlling circuit 5 are connected, and the triodes Q2 and Q3 of the motor driving and controlling circuit 5 are in the cut-off state, such that the motor 4 obtains electricity of the positive direction so as to rotate forward and to drive the driving mechanism 3 to open the container lid 2.

S105: setting the 12th pin and the 13th pin of the microcontroller 7 to low level and setting the 1st pin and the 14th pin of the microcontroller 7 to high level when the container lid 2 is opened in place, wherein the triodes Q1-Q4 of the motor driving and controlling circuit 5 are in the cut-off state, the motor 4 stops rotating, and the application program is ready to enter a delayed lid-opening state.

S106: determining if the user's foot is still touching on the microswitch foot pedal 6, wherein if not, the microswitch 9 is switched off, such that the 10th pin of the microcontroller 7 is set to high level and the application program executes the step S107, wherein if so, the microswitch 9 is switched on, such that the 10th pin of the microcontroller 7 becomes low level and the application program executes the step S110.

S107: determining if the container lid has opened for 3 seconds or more, wherein if it is not 3 seconds yet, the application program executes the step S106, wherein if it has been 3 seconds, the application program executes the step S108.

S108: setting the 1st pin and the 12th pin of the microcontroller 7 to high level and setting the 13th pin and the 14th pin of the microcontroller 7 to low level, wherein the triodes Q1 and Q4 of the motor driving and controlling circuit 5 are in the cut-off state, the triodes Q2 and Q3 of the motor driving and controlling circuit 5 are connected, such that the motor 4 is powered with electricity in a reverse direction and the motor rotates backward to drive the driving mechanism 3 to close the container lid 2.

S109: setting the 12th pin and the 13th pin of the microcontroller 7 to be low level and setting the 1st pin and the 14th pin of the microcontroller 7 to be high level when the container lid is closed completely in place, wherein the triodes Q1-Q4 of the motor driving and controlling circuit 5 are in the cut-off state, the motor 4 stops rotating and the application program is ready to shift to the step S102 to enter a regular standby mode.

S110: determining if the time "t" of touching the microswitch foot pedal 6 is longer than 3 seconds, wherein if it is shorter than 3 seconds, the application program executes the step S106, wherein if it is longer than 3 seconds, the application program executes the step S111.

S111: setting the 2nd pin of the microcontroller 7 to be low level to turn off the LED indicator 8 and prompt the user that the application program has entered the standby-opening state and that the user may retract his or her foot from touching the microswitch foot pedal 6.

S112: determining if the user has retracted his or her foot from touching the microswitch foot pedal 6, wherein if not, the 10th pin of the microcontroller 7 is set to low level and the program will continue on executing the step S112 and wait for the foot retraction, wherein if so, the 10th pin of the microcontroller 7 becomes high level and the application program executes the step S113.

S113: reading the port state of the 10th pin of the microcontroller 7 through the application program, wherein because the microswitch 9 is cut off, the 10th pin of the microcontroller 7 is set to high level through R2.

S114: enabling a wakeup function of the 10th pin of the microcontroller 7.

S115: keeping the container lid 2 remaining in the opened state even though the user's foot has left the microswitch foot pedal 6 and executing a sleep command through the application program, wherein the oscillation of the main oscillator in the microcontroller 7 is stopped, such that as long as the 10th pin of the microcontroller 7 stays at high level, the application program will not run further and the application program will enter a long-opening sleep mode. At this state, the electricity consumption of the electric circuit is merely about 1 microampere.

S116: turning on the microswitch 9 through a single touch on the microswitch foot pedal 6 when the user would like to close the container lid 2 under the long-opening state, such that the port of the 10th pin of the microcontroller 7 is switched from high level to low level and the application program is awakened from the long-opening sleep mode, wherein after the awakening, the main oscillator in the microcontroller 7 starts to oscillate and the application program executes the step S108 to close the container lid and reenters the regular idle and sleep state.

Certainly, the application program may optionally not enter the sleep state during the standby-opening state. Nevertheless, it will have to continuously scan the ports and the main oscillator will have to keep oscillating in such case. As a result, the electricity consumption of the circuit will be greater, which is about 1.5 mA, but it can still allow the standby-opening function.

It is worth mentioning that parts or components of the touching induction garbage container which are not described in the preferred embodiment of the present invention are similar to those of the conventional art as described in the background of the present invention.

One skilled in the art will understand that the embodiment of the present invention as shown in the drawings and described above is exemplary only and not intended to be limiting.

What is claimed is:

1. A controlling method for touching induction garbage container, comprising the steps of:

providing a touching induction garbage container, which comprises a container body, a container lid, a driving mechanism, a motor, a motor driving and controlling circuit, a microswitch foot pedal, and a microcontroller, wherein the container lid is connected with the driving mechanism and the driving mechanism is connected to the motor driving and controlling circuit through the motor, wherein a circuit of the microswitch foot pedal and the motor driving and controlling circuit are both connected to an input port and an output port of the microcontroller respectively;

receiving a triggering signal when the microswitch foot pedal is triggered, wherein the microcontroller has a timing unit which is preset to be "t" seconds as an induction time for standby opening, wherein when the microswitch foot pedal is triggered, the microcontroller receives the triggering signal;

starting a container lid opening process which includes controlling the motor driving and controlling circuit to drive the motor to rotate forward through the microcontroller to further drive the driving mechanism to act and open the container lid, wherein when the container lid is opened, the motor stops rotating;

activating the timing unit to count time when the container lid opening process starts until the triggering of the microswitch foot pedal is released, the triggering signal being sent to the microcontroller stops and the time counting is completed, and a counted timing is obtained; and comparing the counted timing with the preset "t" seconds of the induction time for standby opening;

entering a regular working mode if the counted time is shorter than the preset "t" seconds of the induction time, wherein when the microcontroller enters the regular working mode: the container lid is kept being opened for "s" seconds after the container lid opening process, and then a container lid closing process is implemented, wherein the container lid closing process includes controlling the motor driving and controlling circuit to drive the motor to rotate backward through the microcontroller, such that the motor drives the driving mechanism to act and close the container lid, wherein when the container lid is closed, the motor stops rotating and the induction garbage container enters a standby mode; and entering a standby-opening working mode if the counted time is longer than the preset "t" seconds of the induction time, wherein when the microcontroller enters the standby-opening working mode, the motor is remained motionless after the container lid opening process is finished and the container lid is kept in the opened state, wherein after the microswitch foot pedal is released, the microcontroller still remains the opened state, wherein when the microswitch foot pedal is triggered again, the microcontroller receives the triggering signal again and enters the container lid closing process, wherein when the container lid is closed, the microcontroller enters the standby mode.

2. The controlling method, as recited in claim 1, wherein the microcontroller comprises a wakeup port, connected with the circuit of the microswitch foot pedal, wherein after the triggering of the microswitch foot pedal is released in the standby-opening working mode, the microcontroller does not receive the triggering signal while enabling the wakeup port and entering the sleep mode, wherein when the wakeup port receives another triggering signal from the circuit of the microswitch foot pedal, the microcontroller quits the sleep mode, executes the container lid closing process, and enters the standby mode.

3. The controlling method, as recited in claim 1, wherein the induction time, "t" seconds, for long opening the container lid is 2-4 seconds.

4. The controlling method, as recited in claim 1, wherein the microswitch foot pedal further comprises a LED indicator arranged on top thereof, wherein the LED indicator has a control connected with the output port of the microcontroller, such that when the microswitch foot pedal is triggered and the microcontroller receives the triggering signal, the microcontroller outputs a signal to light up the LED indicator, wherein if the induction time is longer than the "t" seconds of the induction time, the microcontroller enters the standby-opening working mode and outputs a signal to turn off the LED indicator.

* * * * *